Patented Sept. 6, 1932

1,875,408

UNITED STATES PATENT OFFICE

MANUEL M. AMIEVA, JR., OF SAN FRANCISCO, CALIFORNIA, ASSIGNOR TO W. P. FULLER & CO., OF SAN FRANCISCO, CALIFORNIA, A CORPORATION OF CALIFORNIA

METHOD OF PRODUCING PHTHALIC ANHYDRIDE RESINS

No Drawing.   Application filed March 7, 1931. Serial No. 521,006.

The present invention relates to improvements in the method of producing phthalic anhydride resins and the principal object of the invention is to produce a phthalic anhydride resin that is both easily soluble in petroleum solvents and has quick air-drying properties and bakes at a low temperature to a tough flexible film.

A number of patents have been granted on the manufacture of resins from phthalic anhydride and glycerol alone or in combination with other organic acids such as butyric acids, palmitic acids, etc.

If phthalic anhydride, glycerol and the acids from a drying oil, such as linseed oil are caused to react together under suitable conditions a complex resinous product is obtained possessing drying characteristics. The resin from phthalic anhydride and glycerol alone is only soluble in alcohol type solvents. As fatty acids are introduced in the reaction the solubility is modified toward hydrocarbon solvents of powerful solvent action such as the coal tar derivatives. When the percentage of fatty acids is increased to a substantial degree the resin becomes soluble in the ordinary petroleum solvents.

A resin of this type to have valuable technical properties for use in the paint industry must be of a consistency such as that of crude rubber, must produce finishing materials of quick air-drying properties as well as possessing the ability of baking to a hard, tough and flexible film at low temperatures such as 200 degrees Fahrenheit for one or two hours. If the resin possesses the above properties and at the same time it is easily and completely soluble in ordinary petroleum solvents the material is of great technical importance. As explained above products manufactured heretofore may be made soluble in petroleum solvents but they are slow drying and difficult to bake at low temperature for a moderate period of time. In other words they are of low value for the requirements of the modern paint industry.

Products of quick drying and baking properties are being manufactured at the present time. Enamels and varnishes made from them require the use of powerful and expensive solvents.

The following examples will illustrate how the solubility changes as the proportions of fatty acids vary:

(a)

Phthalic anhydride_____2 parts by weight
Glycerine_____1 part by weight

The resin produced is soluble in alcohol type and ketones only.

(b)

Phthalic anhydride_____2 parts by weight
Glycerine_____1 part by weight
Linseed oil acids_____1 part by weight The resin is soluble in mixtures of alcohols and hydrocarbons. It air-dries quickly and bakes easily but produces very brittle films.

(c)

Phthalic anhydride_____2 parts by weight
Glycerine_____1 part by weight
Linseed oil acids_____2 parts by weight The resin produces finishes which bake easily and air-dry quickly to a hard, tough and flexible film. However, it requires powerful solvents such as the coal tar distillates. Moderate amounts of petroleum solvents may be used in combination with the coal tar solvents.

(d)

Phthalic anhydride_____ 2 parts by weight
Glycerine_____ 1 part by weight
Linseed oil acids_____ 4 parts by weight The resin derived is easily soluble in petroleum solvents but has very slow drying properties and bakes with difficulty at low temperatures to a flexible but soft film.

These examples are given in simple proportions merely to illustrate the fact that in order to produce a product soluble in petroleum solvents the technically important properties of quick drying and low temperature baking to a tough, flexible film have to be sacrificed. As this type of reaction does not follow molecular proportions the amounts may be varied widely but in all cases the solubility in petroleum solvents will be in direct proportion to the percentage of fatty acids in combination. Linseed oil fatty acids are used in preference because they are the most practical from the standpoint of solubility and paleness of the finished product. However, any other type of fatty acid may be used.

At the present time these resinous products are manufactured by either causing all the ingredients to react at temperatures ranging from 300 up to 600 degrees Fahrenheit until the desired degree of condensation is obtained as indicated by testing the solubility and consistency of the resin.

Another method mentioned is to first cause the phthalic anhydride and glycerine to react and after a given period of time introduce the fatty acids and proceed until the desired results are obtained as in the first mentioned method. In either case the solubility of the product will be along the lines of examples a, b, c, etc.

My new method of manufacture may be illustrated as follows: I use the following ingredients, for example:

Phthalic anhydride_____ 4 parts by weight
Glycerine_____from 2 to 4 parts by weight
Linseed oil acids_from 2 to 4 parts by weight The essence of the process is that the reaction is carried in two stages. In the first stage only a part of the total phthalic anhydride required is caused to react with the rest of the ingredients and after a given period of time the balance is incorporated as illustrated by the following example which I have found to be the best. I first mix:

Phthalic anhydride _____ 2 parts by weight
Glycerine _____ 2 parts by weight
Linseed oil acids_____ 4 parts by weight The mixture is allowed to react in a suitable vessel at temperatures between 325 and 400 degrees Fahrenheit for a period of about six hours. At the end of this time two more parts by weight of phthalic anhydride are introduced and the mixture allowed to react within the same range of temperatures for an added period of about six hours. The reaction is carried under carbon dioxide in order to prevent darkening. The product is a pale rubbery resin easily soluble in ordinary petroleum solvents. Varnishes and enamels made from it will dry in the air with the addition of a small amount of lead, cobalt and manganese driers to a hard, tough flexible film in 4 to 6 hours. Without the need of driers the varnishes and enamels will bake at 200 degrees Fahrenheit for two hours to a film of remarkable toughness, hardness and flexibility. Finishes of this type have proven to be extremely durable when exposed to the weather. The above method enables me to produce a very economical finish of great technical importance and one that may be handled like an ordinary oil paint in regards to its method of application and solvents required for dilution. These features are of strong appeal to the users. Exhaustive investigations and tests have convinced me that I have a product much more desirable from the practical standpoint than the ones being manufactured at the present time.

I claim:

1. The method of combining predetermined quantities of phthalic anhydride, glycerine and fatty acids which consists in first causing the glycerin and the fatty acid to react with a portion of the phthalic anhydride and in causing the resulting product to react with the remaining portion of phthalic anhydride, each of the portions representing a substantial part of the original amount.

2. The method of combining predetermined quantities of phthalic anhydride, glycerin and fatty acids which consists in first causing the glycerin and the fatty acid to react with a portion of the phthalic anhydride at a temperature in excess of 325 deg. F. and in causing the resulting product to react with the remaining portion of phthalic anhydride at a similar temperature, each of the portions representing a substantial part of the original amount.

3. The method of combining predetermined quantities of phthalic anhydride, glycerin and fatty acids which consists in first causing the glycerin and the fatty acid to react with a portion of the phthalic anhydride at a temperature in excess of 325° F. for a period decreasing with the increase in temperature and in causing the resulting product to react with the remaining portion of phthalic anhydride for a similar time period and at a similar temperature, each of the portions representing a substantial part of the original amount.

4. The method of combining predetermined quantities of phthalic anhydride, glycerin and fatty acids which consists in first causing the glycerin and the fatty acid to react with substantially one-half of the quantity of phthalic anhydride and in causing the resulting product to react with the remaining half of the phthalic anhydride.

5. The method of combining predetermined quantities of phthalic anhydride, glycerin and linseed oil acids which consists in first causing the glycerin and the acid to react with a portion of the phthalic anhydride and in causing the resulting product to react with the remaining portion of phthalic anhydride, each of the portions representing a substantial part of the original amount.

6. The method of combining predetermined quantities of phthalic anhydride, glycerin and linseed oil acids which consists in first causing the glycerin and the acid to react with a portion of the phthalic anhydride at a temperature in excess of 325 deg. F., and in causing the resulting product to react with the remaining portion of phthalic anhydride at a similar temperature, each of the portions representing a substantial part of the original amount.

Signed at San Francisco, in the county of San Francisco and State of California, this 25th day of February, A. D. 1931.

MANUEL M. AMIEVA, Jr.